United States Patent [19]
Marquis

[11] 3,818,680
[45] June 25, 1974

[54] MALEIC ANHYDRIDE RECOVERY METHOD

[75] Inventor: David M. Marquis, Lafayette, Calif.

[73] Assignee: Chevron Research Company, San Francisco, Calif.

[22] Filed: Dec. 17, 1971

[21] Appl. No.: 209,069

[52] U.S. Cl.............................. 55/48, 55/56, 55/82, 55/84
[51] Int. Cl............................................ B01d 19/00
[58] Field of Search ..................... 55/48, 56, 82, 84; 260/364.4, 364.8

[56] References Cited
UNITED STATES PATENTS

| | | | |
|---|---|---|---|
| 2,140,140 | 12/1938 | Punnett............................ | 260/346.4 |
| 2,294,130 | 8/1942 | Porter............................... | 260/346.4 |
| 2,574,644 | 11/1951 | Landau.............................. | 55/48 X |

FOREIGN PATENTS OR APPLICATIONS

| | | | |
|---|---|---|---|
| 833,230 | 4/1960 | Great Britain................... | 260/346.4 |
| 1,132,784 | 11/1968 | Great Britain................... | 260/346.4 |

Primary Examiner—Samih N. Zaharna
Assistant Examiner—Richard W. Burks
Attorney, Agent, or Firm—G. F. Magdeburger; John Stoner, Jr.; T. G. DeJonghe

[57] ABSTRACT

Maleic anhydride is recovered from a gaseous mixture containing the anhydride and water by contacting the mixture with a normally liquid intramolecular carboxylic acid anhydride, especially at a temperature in the range 55° C. to 260° C. under sufficient pressure for absorption of the maleic anhydride.

25 Claims, 1 Drawing Figure

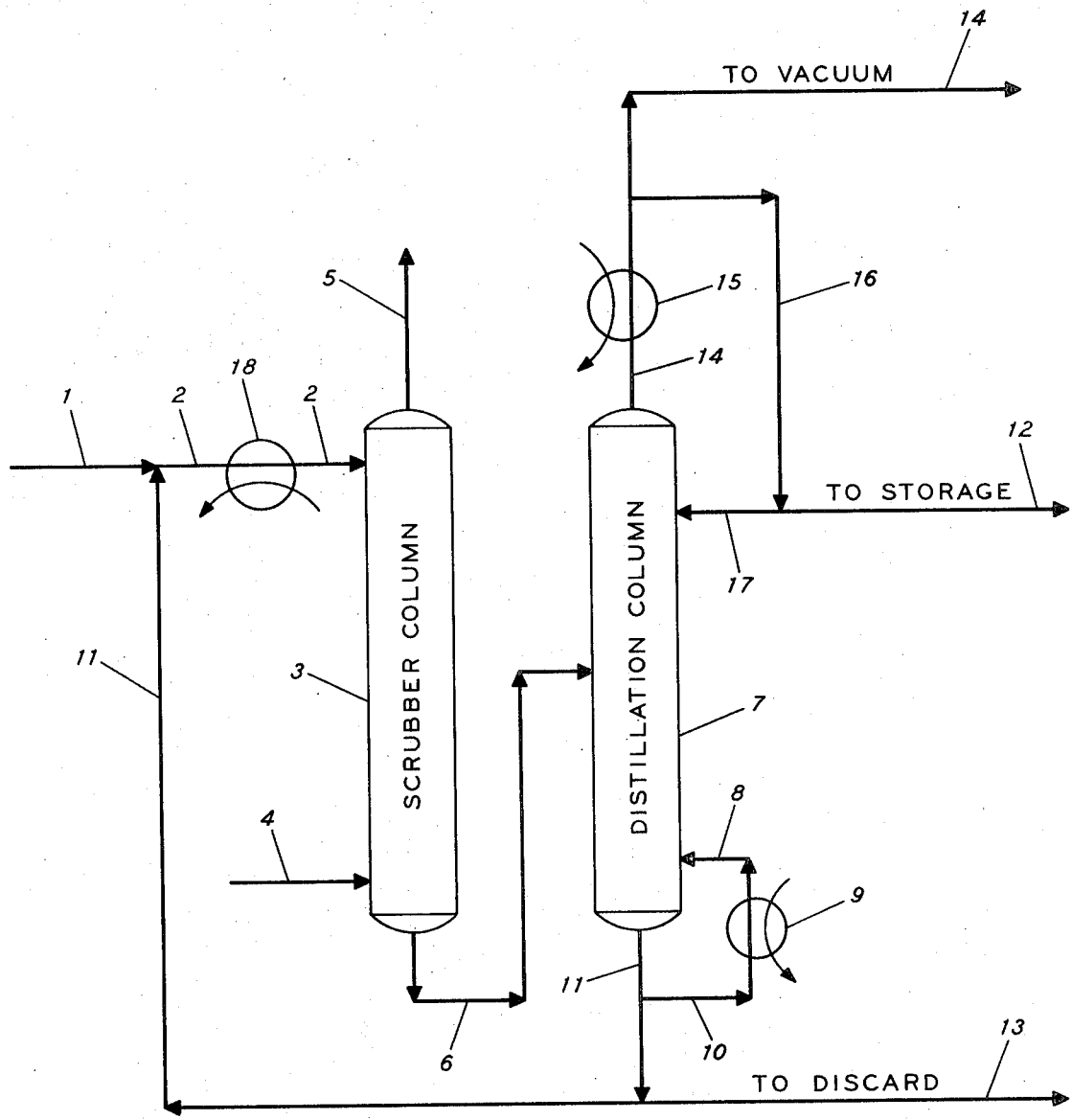

MALEIC ANHYDRIDE RECOVERY METHOD

BACKGROUND OF THE INVENTION

1. Field of the Invention

This invention is concerned with an improved process for the recovery of maleic anhydride from hot vaporous or gaseous mixtures, especially from the hot reaction gases resulting from the vapor phase oxidation of a suitable hydrocarbon feed.

2. Prior Art

It is known in the art to recover maleic anhydride values from vaporous mixtures by a variety of means including scrubbing the mixture with a liquid agent such as water (cf., U.S. Pat. No. 2,638,481), an aqueous solution or slurry, a phthalate ester, tricresyl phosphate, dibutyl maleate, or diphenyl pentachloride. These recovery methods suffer from a number of disadvantages. Aqueous scrubbing liquids cause the conversion of most if not all of the maleic anhydride to maleic acid. The acid must ultimately be dehydrated to form the desired anhydride. In this process chain — condensation, hydrolysis and dehydration — an undesirable side reaction can also take place, i.e., the concurrent isomerization of a substantial portion of the maleic values to fumaric acid.

The conversion of maleic to fumaric acid, even in small amounts, is undesirable because of: 1) loss of product values, and 2) the difficulties involved in removing fumaric acid from a process system. Usually, a periodic interruption of the process is necessary in order to open up the system and mechanically or chemically remove accumulated fumaric acid from the process train.

While the esters or chlorinated hydrocarbon have some utility as scrubbing agents for maleic anhydride recovery from a gaseous mixture, a number of disadvantages are experienced in such use. The loading factor of these agents in particular is poor, for example, only 2–3 parts by weight of maleic anhydride are recovered per 100 parts of the phthalate ester. Thus, a large inventory and flow of the ester is necessary for an efficient maleic anhydride recovery stage.

A method for the recovery of maleic anhydride in the presence of water vapor without concurrent hydrolysis and isomerization of maleic acid is needed. Yet more desirable is the discovery of a recovery means, a scrubbing liquid or the like, which has an improved loading factor.

THE INVENTION

A method has now been found by which maleic anhydride can be effectively recovered from a gaseous mixture containing the anhydride by passing the mixture into contact with an intramolecular carboxylic acid anhydride scrubbing agent in the liquid phase, provided that the agent has a boiling point which is at least about 15° C. above the boiling of maleic anhydride. Where the gaseous mixture also contains water vapor, the present method is especially effective in that concurrent hydrolysis of maleic anhydride to the acid and isomerization of the acid to fumaric acid is avoided by maintaining the temperature of the intramolecular anhydride scrubbing agent at least about 10° C. above the dew point of water. A contact temperature of about 55° C. is ordinarily above the dew point of water for gaseous maleic anhydride-water mixtures produced by typical vapor phase hydrocarbon oxidation processes.

Surprisingly, intramolecular carboxylic anhydrides in general exhibit excellent loading factors for maleic anhydride and these may be as much as 5 to 10 times better than the factor for phthalate esters. Corresponding reductions in the process burden for handling the scrubbing liquid are, of course, also experienced. In addition, little or no hydrolysis and isomerization of maleic anhydride to maleic acid and fumaric acid, respectively occurs when the contact temperature is substantially above the dew point of water.

By substantially inert, as used herein, with respect to the scrubbing agent is meant by definition that the agent contains no carbon-carbon triple bond unsaturation (acetylenic unsaturation) and contains no conjugated carbon-carbon double bond unsaturation (olefinic unsaturation).

EMBODIMENT

In a preferred embodiment a branched chain mono-$C_{12\text{-}15}$-alkenyl substituted succinic anhydride (ASA) mixture is used to extract (absorb) maleic anhydride from a hot mixture of gases. A representative mixture is the effluent product stream from a fixed-bed vapor phase reactor in a catalyzed air oxidation of a suitable hydrocarbon feed, for example, $n$-butane, benzene, butene, or the like. Such a stream ordinarily contains from one-half to two volume percent of maleic anhydride, from 2 to 6 volume percent of water vapor and other components, such as carbon dioxide and unoxidized hydrocarbon feed, in minor amounts.

Referring to the schematic flow diagram, Figure, unit 3 is a 5–50 plate, preferably about 30 plate, sieve-tray scrubbing (absorption) column and unit 7 is a reduced pressure, fractional distillation column. In the continuous mode of the recovery method, the liquid ASA absorbent is introduced via line 2 and indirect heat exchanger 18 to column 3 at a location above the top tray of the column. By means of the exchanger the temperature of the ASA is adjusted to a temperature in the range 65° to 125° C., preferably about 75° C. By means of a pressure regulator valve not shown, the pressure in the column 3, is maintained in the range 1.1 to 4.4 atms., preferably about 3 atms. Via line 4 the maleic anhydride-containing gas stream is introduced into the column, 3, at a location below the bottom tray of the column, 3, and flows upward. Thus, in countercurrent flow, the foregoing gas and liquid streams pass up and down column 3, respectively. During this passage, at least 95 percent of the maleic anhydride in the gas stream is condensed and absorbed by the ASA. The residual gas, including the water, carbon dioxide and the unoxidized hydrocarbon components, is vented from the process via line 5.

The scrubbing liquid flow rate is readily established and depends upon the concentration of maleic anhydride in the gaseous effluent product stream, upon the total volume of the effluent stream, and upon the desired maleic anhydride concentration for the scrubber liquid which is withdrawn from the scrubber stage. Thus, the scrubber column is sized according to the usual considerations, as known in the art, to result in an orderly flow of liquid and gas through the column. Enough trays or stages are provided so that the effluent gas stream contains but a minor amount of maleic anhydride.

The resulting pregnant ASA contains an amount of maleic anhydride in the range 10 to 30 weight percent, usually about 20 percent, and is withdrawn from column 3 via line 6 and passed to and introduced into the distillation (e.g., sieve— or bubble—tray) column, 7, at a midpoint.

In column 7 the maleic andydride content of the delivered stream is separated from the ASA by fractional distillation at or below atmospheric pressure. Desirably, a pressure in the range 0.034–0.2 atm., preferably about 0.07 atm., is used. By means of the indirect heat exchanger, 9, and associated transfer lines 8 and 10, the temperature in the column, 7, is maintained in the range 200°–230° C. when the pressure is about 1 psia. In the distillation, the maleic anhydride is separated as an overhead vapor fraction which is condensed by means of indirect heat exchanger 15. Part of the condensate is returned to the column via lines 16 and 17 and the balance is withdrawn via line 12 for transfer to storage or further purification, as desired. The maleic anhydride product is usually about 99 plus percent pure.

The resulting bottom fraction is ASA which contains a minor amount of maleic anhydride, preferably less than 1 weight percent. It is withdrawn from the column, 7, via line 11 for recycle to the process. If desired, as where there is a tendency for the accumulation with time of polymeric side products, an ASA bleed stream is withdrawn from the process via line 13. As required, fresh ASA is introduced to the process via line 1.

The reduction of pressure required for the distillation in the column, 7, is effected via line 14 by ordinary means not shown. Similarly, pursuant to conventional practice, ordinary elements such as stream eductors, pumps, line gauges and the like have been omitted from the schematic figure.

Intramolecular carboxylic acid anhydrides, in general, contain a 5- or 6-membered heterocyclic ring similar to the heterocyclic ring of maleic anhydride. These compounds, individually and in mixtures, appear to have a marked affinity for maleic anhydride. Accordingly, substantially inert intramolecular anhydrides which are liquids at a temperature within the range of the method are useful as scrubbing agents and are contemplated for such use so long as maleic anhydride can be conveniently separated from mixtures of the agent and the anhydride. To this end, the agent should have a boiling point which is at least 15° C. above the boiling point of maleic anhydride.

The hydrocarbyl substituted succinic anhydrides (HYSSA compounds) and mixtures of these anhydrides are especially satisfactory for use as scrubbing agents in the practice of the invention. They contain a 5-membered heterocyclic ring as does also maleic anhydride. They usually have a boiling point which is substantially above the boiling point of maleic anhydride. So long as the hydrocarbyl (hydrocarbon) substituent group is free of carbon-carbon triple bond unsaturation and of conjugated carbon-carbon double bond unsaturation, there is usually no material amount of undesirable reaction between a succinic-type scrubbing agent and maleic anhydride.

The use of mixtures of HYSSA compounds or of mixtures of HYSSA compounds with conventional nonaqueous scrubbing agents is often advantageous for the reason that such mixtures are, in general, liquids over a larger range of temperature than is an individual HYSSA compound, or than is an individual HYSSA compound plus adsorbed maleic anhydride. Where HYSSA is used in admixture with a conventional nonaqueous adsorbent, the relative amounts of HYSSA and ordinary adsorbent in the mixture should yield a homogeneous mixture and sufficient (at least about 30 mole percent) HYSSA to result in an appreciable improvement in the loading factor for the scrubbing agent.

Representative HYSSA compounds suitable for use in my method include those of the formula $R(Z)n$, where R is a substantially inert hydrocarbon group having a carbon atom content in the range from 1 to about 25, where Z is a group of the formula

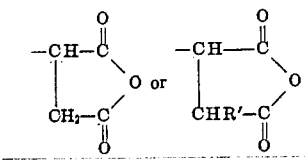

where R' is an alkyl group having a carbon atom content in the range from 1 to about 15, and where n is 1 or 2; when n is 1, R is a monovalent group, and when n is 2, R is a divalent group.

In the formulated compounds above a minor amount, from 1 to 5, of the hydrogen atoms of the R and R' groups may be replaced by inert substituents such as chloride, carbaloxy, and the like. Ordinarily, the cost of the agent is the controlling factor. Hence, relative to the alkyl and alkenyl substituted succinic anhydride compounds, the above inertly substituted agents are useful but less practical. Alkenyl substituted succinic acids (ASA) are readily available by the thermal reaction of maleic anhydride with an olefin. The alkyl analogues are also readily available from the hydrogenation of the alkenyl compounds under ordinary mild hydrogenation conditions. The latter are also useful agents for the present method.

The alkenyl substituted succinic anhydrides form the diadducts, i.e.,

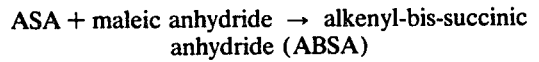

The bisadducts, ABSA, are also excellent agents for the absorption of maleic anhydride from a gaseous mixture. The absorbed maleic anhydride can also be readily distilled away from the ABSA.

Representative substituted succinic anhydrides useful as extraction agents for the method of the invention include the anhydrides of the acids 2-methylsuccinic, 2,3-dimethylsuccinic, 2-isopropylsuccinic, 2-(4-decyl)-succinic, 2-cyclohexylsuccinic, 2-propyl-3-decylsuccinic; anhydrides of straight chain alkyl and alkenyl succinic acids such as 7-eicosenylsuccinic, 8- heneicosenylsuccinic, 6-hexadecenylsuccinic, 9-docosenylsuccinic, 5-octadecenylsuccinic, 8-heptadecylsuccinic, 10-eicosylsuccinic, 9-nonadecylsuccinic, 8-nonadecylsuccinic, and mixtures thereof; anhydrides of the polypropylene succinic acids such as dipropenylsuccinic, tripropenylsuccinic, tetrapropenylsuccinic, pentapropenylsuccinic, hexapropenylsuccinis; the $C_{10}$-$C_{20}$ olefin/maleic anhydride adducts, the $C_{15}$-$C_{20}$ straight chain internal olefin/maleic anhydride adducts, the $C_{12}$-$C_{15}$ branched chain olefin/maleic anhydride adducts, the di-, tri- and tetrapropylene/maleic anhydride adducts, and the di-, tri- and tetra-isobutylene/maleic anhydrine adducts, etc. The preferred compounds are made by the adduction of maleic anhydride with (1) a blend of olefins obtained by the dehydrogenation of normal paraffins having from 15 to 20 carbon atoms, i.e., a mixture of $C_{15}$-$C_{20}$ straight chain internal olefins, or (2) a blend of polypropylene olefins having from 9 to 15, preferably 12 to 15 carbon atoms. In general, so long as the hydrocarbon groups are substantially inert (see definition above), and the agent is a liquid at a temperature within the aforementioned range, the structure of the hydrocarbon group substituents for the succinic anhydride agents herein may have any ordinary molecular configuration, i.e., alkyl, cycloalkyl, aryl, alkylaryl, alkenyl, cycloalkenyl and combinations thereof. Of the straight or branched chain alkyl or alkenylsuccinic anhydrides, the branched chain analogues are preferred because of the lower melting points which these compounds exhibit. The lower the melting point of the agent, the wider is the temperature range over which the agent is useful in the present method.

The method of the invention is useful, in general, for the separation of maleic anhydride from gaseous mixtures comprising water and maleic anhydride. It is useful, in general, for the recovery of vaporized maleic anhydride from the effluent product streams which result from the air or oxygen partial oxidation of a hydrocarbon feed and this use is contemplated herein.

In order to avoid hydrolysis and isomerization in the extraction of maleic anhydride from a gaseous mixture containing vaporized water and maleic anhydride, the temperature of the liquid succinic anhydride-type absorption agent must be substantially (at least about 10° C.) above the dew point for water and below the boiling point of maleic anhydride. Useful temperatures are in the range from about 55° to 260° C. under elevated pressure if necessary, and preferably 65° C. to 125° C.

The temperature desirably used may vary depending somewhat upon the pressure. Thus, as the pressure of the contacting is increased, a relatively higher temperature is needed. Satisfactory pressures are, in general, in the range 0.07 to 7 atmospheres, preferably 0.1 to 3.5 atmospheres. Operation of the method at or near the atmosphere pressure is usually most convenient.

The manner in which the contacting is effected may vary widely and included are the usual means employed in the continuous or batch stage extraction of a gas from a mixture of gases such as:

1. introducing the gas stream into a body of the liquid agent;
2. introducing the gas stream into a descending spray of the liquid agent;
3. use of a multiplate scrubbing column of standard) commercial design, such as sieve tray, bubble-cap tray rain-deck, and the like.

The number of contact stages desirable used in the method varies depending upon the degree of recovery of the maleic anhydride desired. In general, a useful recovery is experienced from the use of a single contact stage. In order to achieve a practical recovery in the range 90 plus percent), multistage contacting is needed. Thus, a useful result obtains from the employment of from 1 to 30 stages (theoretical), preferably 5 to 15, in the method of the invention. The corresponding range for the recovery of the maleic anhydride is 75 to 99 plus percent.

A fractional distillation, preferably under a reduced pressure, is a convenient means for the separation of the absorbed maleic anhydride from the liquid absorption agent. For this purpose a stripper column having from 1 to 20, preferably 2 to 5 stages (theoretical) is satisfactory. For the fractional distillation a reboiler temperature in the range 150°–300° C., preferably 200°–230° C., is in general satisfactory. A useful pressure for the distillation is, in general, in the range $5 \times 10^{-3}$ to 1 atmosphere, preferably $3.3 \times 10^{-2}$ to $2.6 \times 10^{-1}$ atmosphere. As a practical matter, the maleic content of the absorption agent is not completely removed. Thus, in a continuous operation a reduction of maleic content of the absorption agent in the stripper column to an amount in the range 0.2 to 1 percent (weight) is ordinarily advantageous.

The following examples further illustrate the method of the invention. The absorption agent as the monomaleic anhydride adduct from the reaction of a commercial $C_{15}$-$C_{20}$ internal olefin with maleic anhydride, i.e., $C_{15}$-$C_{20}$-ASA. The maleic anhydride-containing gas was the effluent product stream from the oxidation of an n-butane-air mixture in a vapor phase fixed bed reactor. This stream contained about 0.6 volume percent of maleic anhydride and water vapor.

The contacting of the effluent oxidate gas stream with the ASA was effected in a 1-inch ID, 20-sieve tray column in the manner depicted in the Figure (unit 3).

EXAMPLES 1–8:

In these examples the feed ratio of ASA (grams) to gas (standard cubic feet per hour) was varied at atmospheric pressure while maintaining the contact temperature at about 62° C. The relative scrubbing efficiencies for the several ratios were as follows (average for 2 runs):

| EXAMPLE NO. | Feed Ratio, ASA:Gas, g/SCF | MA Absorbed, % |
|---|---|---|
| 1 | 3 | 49 |
| 2 | 3.5 | 54 |
| 3 | 3.8 | 58 |
| 4 | 3.9 | 66 |
| 5 | 4.9 | 91 |
| 6 | 5.0 | 87 |
| 7 | 5.3 | 92 |
| 8 | 5.4 | 97 |

Each condensed phase contained no water and no maleic acid. The maleic anhydride content of the scrubber liquid was in the range 11 to 13 weight percent.

EXAMPLE 9:

As in Example 1, except that the temperature was lowered to about 51° C. The condensed phase contained water, and the infrared analysis demonstrated that acid was present. The presence of solid matter in the condensed phase was verified by visual inspections.

The above examples demonstrate that maleic anhydride can be efficiently recovered from a gaseous mixture without formation of maleic and fumaric acids by contacting the gas with a substituted succinic anhydride in the liquid phase provided that the temperature of the liquid at the contacting is substantially (10° to 20° C) above the dew point (ca 38° C) of the water.

EXAMPLE 10:

Maleic anhydride was separated by fractional distillation from a solution of the anhydride in a $C_{15}C_{20}$-alkenyl substituted succinic anhydride mixture. For the separation a 20 sieve tray fractionating column was employed in the manner shown in the schematic flow diagram (unit 7) under the following conditions:

| | |
|---|---|
| Pressure, atmospheres | 0.07 |
| Reboiler temperature, °C. | 200–215 |
| Feed, % MA | 12 |

The distillate was 99.9 percent pure maleic anhydride, and the distillation bottoms contained 1 weight percent of maleic anhydride.

EXAMPLES 11–12:

In these examples the scrubbing agent was tetrapropylene succinic anhydride (TPSA). The gas stream was the effluent stream from an oxidation unit which contained about 0.5 volume percent of maleic anhydride and the usual amount of water vapor. At a pressure of about 1 atmosphere and a column temperature in the range 71° C. to 76° C., the following results were obtained:

| EXAMPLE NO. | Feed Ratio, TPSA:Gas, g/SCF | MA Absorbed, % |
|---|---|---|
| 11 | 5.0 | 70 |
| 12 | 4.7 | 72 |

The condensed phase in each example contained no water and no maleic acid. The scrubber product stream contained 6.5–8 weight percent of maleic anhydride. The lower (compared with the ASA runs 5 and 6 above) maleic absorption was due to the lower concentration of maleic anhydride in the feed gas.

The foregoing examples demonstrate that maleic anhydride can be effectively recovered from a gaseous mixture containing the anhydride and water vapor without the formation of maleic and fumaric acids by the method of the invention.

As will be evident to those skilled in the art, numerous modifications in this method can be made or followed, having in mind tha foregoing disclosure and discussion without departing from the spirit or scope of the disclosure or from the scope of the following claims.

I claim:

1. The method for the recovery of maleic anhydride from a gaseous mixture containing the anhydride, which comprises passing said mixture into contact with a scrubbing agent in the liquid phase at a temperature below about 260° C. and at a pressure sufficient to effect maleic anhydride absorption into the liquid phase, said agent being one or more intramolecular carboxylic acid anhydrides having a boiling point at least 15° C. above the boiling point of maleic anhydride, and said pressure being in the range from about 0.07 to 7 atmospheres.

2. The method as in claim 1 wherein the mixture contains water vapor and the contact temperature is at least 10° C. above the dew point of water.

3. The method as in claim 2 wherein the contact temperature is in the range from about 55° C. to 260° C.

4. The method as in claim 2 wherein the contact temperature is in the range from about 65° C. to 125° C.

5. The method as in claim 1 wherein said scrubbing agent contains a diluent, said diluent being selected from the group consisting of ordinary non-aqueous maleic anhydride scrubbing agents, and wherein the intramolecular anhydride content of the resulting diluted agent is at least about 30 mol percent.

6. The method as in claim 1 wherein said pressure is in the range from about 0.1 to 3.5 atmospheres.

7. The method as in claim 1 wherein said pressure is about atmospheric pressure, said contact is effected in a multicontact staged column having a number of theoretical stages in the range from 1 to 30.

8. The method for the recovery of maleic anhydride from a gaseous mixture containing maleic anhydride and water, which comprises condensing said maleic anhydride by passing said mixture into contact with a liquid scrubbing agent at a temperature in the range from about 55° C. to 260° C. and at a pressure sufficient to absorb maleic anhydride into the liquid phase, said pressure being in the range from about 0.07 to 7 atmospheres, said contact temperature being at least about 10° C. above the dew point of water, and said agent comprising one or more compounds of the formula $$R(Z)_n$$

wherein R is a substantially inert hydrocarbon group having a carbon atom content in the range from 1 to about 25, wherein Z is a group of the formula

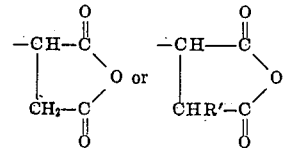

wherein R' is an alkyl group having a carbon atom content in the range from 1 to about 15, and $n$ being 1 or 2, and where $n$ is 1, R is a monovalent group, and where $n$ is 2, R is a divalent group, and said compounds having a carbon atom content in the range from 5 to about 54.

9. The method as in claim 8 wherein said temperature is in the range from about 65° C. to 125° C.

10. The method as in claim 8 wherein said pressure is in the range from about 0.1 to 3.5 atmospheres.

11. The method as in claim 8 wherein said pressure is about atmospheric pressure.

12. The method as in claim 8 wherein said contacting is effected in a multicontact staged column having a number of theoretical stages in the range from 1 to 30.

13. The method as in claim 12 wherein said range of theoretical stages is from about 5 to 15.

14. The method as in claim 8 wherein said agent has a carbon atom content in the range from about 10 to 25 and is a branched or straight chain alkenyl or alkyl substituted succinic anhydride.

15. The method as in claim 14 wherein said agent is an alkenyl substituted succinic anhydride.

16. The method as in claim 8 wherein said agent is a bissuccinic anhydride substituted alkene.

17. The method as in claim 15 wherein R of said formula is in the range $C_{12}$ to $C_{15}$.

18. The method as in claim 15 wherein R of said formula is in the range $C_{15}$ to $C_{20}$.

19. The method as in claim 8 wherein said agent contains a minor amount of inert substituent groups.

20. The method for the recovery of maleic anhydride from a gaesous mixture containing maleic anhydride and water comprising
   1. passing said mixture into contact with an alkenyl or alkyl substituted succinic anhydride in the liquid phase, said contacting being in a liquid-gas contact zone at a temperature in the range from about 55° C. to 260° C., said temperature being at least about 10° C. above the dew point of water, said contacting being at a pressure in the range from about 0.07 to 7 atmospheres, and said succinic anhydride having a carbon atom content in the range from about 5 to 54;
   2. withdrawing a portion of the resulting solution from said zone; and
   3. separating maleic anhydride from said solution by fractional distillation.

21. The method as in claim 20 wherein said mixture is the effluent product stream from an oxidation process, said process being an air or oxygen oxidation of a vaporized hydrocarbon feed.

22. The method as in claim 20 wherein said agent has a carbon atom content in the range from about 10 to 25.

23. The method for the recovery of maleic anhydride from a gaseous mixture containing water, said mixture being the effluent product stream from a catalyzed air oxidation of n-butane in the vapor phase, comprising:

1. absorbing maleic anhydride from said mixture by passing said mixture into contact with an alkenyl substituted succinic anhydride in the liquid phase, said succinic anhydride being a branched chain mono-$C_{12}$-$C_{15}$-alkenyl succinic anhydride, said contacting being at a temperature of about 75° C. and a pressure of about 30 psig; and
   2. separating maleic anhydride from the resulting solution by fractional distillation.

24. The method as in claim 1 wherein said agent contains inert substituted groups, said groups being present in an amount in the range from 1 to 5.

25. The method as in claim 8 wherein said agent contains inert substituted groups, said groups being present in an amount in the range from 1 to 5.

* * * * *